United States Patent
Hashimoto et al.

(10) Patent No.: US 11,169,074 B2
(45) Date of Patent: Nov. 9, 2021

(54) METHOD OF OPTIMIZING MICROPARTICLE SUCTION CONDITION AND MICROPARTICLE SEPARATION DEVICE

(71) Applicant: SONY CORPORATION, Tokyo (JP)

(72) Inventors: Gakuji Hashimoto, Kanagawa (JP); Tatsumi Ito, Kanagawa (JP); Kazuya Takahashi, Saitama (JP); Junji Kajihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 151 days.

(21) Appl. No.: 16/606,518

(22) PCT Filed: Feb. 20, 2018

(86) PCT No.: PCT/JP2018/005887
§ 371 (c)(1),
(2) Date: Oct. 18, 2019

(87) PCT Pub. No.: WO2018/216279
PCT Pub. Date: Nov. 29, 2018

(65) Prior Publication Data
US 2020/0124517 A1    Apr. 23, 2020

(30) Foreign Application Priority Data
May 26, 2017 (JP) .............................. JP2017-105010

(51) Int. Cl.
*G01N 15/14*    (2006.01)
*B01L 3/00*     (2006.01)

(52) U.S. Cl.
CPC .... *G01N 15/1404* (2013.01); *B01L 3/502715* (2013.01); *B01L 3/502761* (2013.01);
(Continued)

(58) Field of Classification Search
CPC ..... B01L 2200/0636; B01L 2200/0647; B01L 2300/06; B01L 2300/0819;
(Continued)

(56) References Cited

U.S. PATENT DOCUMENTS

2012/0153185 A1* 6/2012 Ito ..................... B01L 3/502761
                                                    250/458.1
2014/0299522 A1* 10/2014 Ito ....................... F16K 99/0028
                                                    209/577

FOREIGN PATENT DOCUMENTS

CN    102564925 A    7/2012
CN    107532990 A    1/2018
(Continued)

OTHER PUBLICATIONS

International Search Report and Written Opinion of PCT Application No. PCT/JP2018/005887, dated May 29, 2018, 09 pages of ISRWO.

*Primary Examiner* — Jennifer Wecker
(74) *Attorney, Agent, or Firm* — Chip Law Group

(57) ABSTRACT

In the present technology, the timing at which suction is performed is optimized in order to enhance the microparticle separation performance in a technology for separating target microparticles in a microchip. For this purpose, the present technology provides a method of optimizing a microparticle suction condition, and the like, using a microchip having a main flow channel through which a liquid containing a microparticle flows, a microparticle suction flow channel arranged coaxially with the main flow channel, and a branch flow channel branching from the main flow channel. The method includes: a branch point specifying process of specifying a branch point at which the branch flow channel branches from the main flow channel; and a time assignment process of assigning a time $T_1$ to be applied to suction of the microparticle.

8 Claims, 10 Drawing Sheets

(52) U.S. Cl.
CPC . *B01L 3/502776* (2013.01); *B01L 2200/0636* (2013.01); *B01L 2200/0647* (2013.01); *B01L 2300/06* (2013.01); *B01L 2300/0819* (2013.01)

(58) Field of Classification Search
CPC ......... B01L 3/502715; B01L 3/502761; B01L 3/502776; G01N 15/1404; G01N 15/1427; G01N 15/1459; G01N 15/1484; G01N 2015/1415; G01N 2015/149
See application file for complete search history.

(56) References Cited

FOREIGN PATENT DOCUMENTS

| | | |
|---|---|---|
| JP | 2012-127922 A | 7/2012 |
| JP | 2014-036604 A | 2/2014 |
| WO | 2016/182034 A1 | 11/2016 |

\* cited by examiner

METHOD OF OPTIMIZING MICROPARTICLE SUCTION CONDITION AND MICROPARTICLE SEPARATION DEVICE

CROSS REFERENCE TO RELATED APPLICATIONS

This application is a U.S. National Phase of International Patent Application No. PCT/JP2018/005887 filed on Feb. 20, 2018, which claims priority benefit of Japanese Patent Application No. JP 2017-105010 filed in the Japan Patent Office on May 26, 2017. Each of the above-referenced applications is hereby incorporated herein by reference in its entirety.

TECHNICAL FIELD

The present technology relates to a method of optimizing a microparticle suction condition and a microparticle separation device. In more detail, the present technology relates to: a method of optimizing a microparticle suction condition using a microchip having a main flow channel through which a liquid containing a microparticle flows, a microparticle suction flow channel arranged coaxially with the main flow channel, and a branch flow channel branching from the main flow channel; and a microparticle separation device that separates a microparticle in the microchip.

BACKGROUND ART

A variety of devices have been developed so far to separate microparticles. For example, in a microparticle separation system used in a flow cytometer, a laminar flow made up of a sample fluid containing cells and a sheath fluid is discharged from an orifice formed in a flow cell or a microchip. When discharged, a predetermined vibration is applied to the laminar flow to form droplets. The movement direction of the formed droplets is electrically controlled depending on whether or not target microparticles are contained, whereby the target microparticles can be separated.

Technologies for separating target microparticles in a microchip without forming droplets as described above have also been developed.

For example, Patent Document 1 below describes "a microchip having a sample fluid introduction flow channel through which a sample fluid containing a microparticle flows; at least one pair of sheath fluid introduction flow channels which join the sample fluid introduction flow channel from two sides of the sample fluid introduction flow channel and introduce a sheath fluid around the sample fluid; a junction flow channel which is in communication with the sample fluid introduction flow channel and the sheath fluid introduction flow channels and in which the liquids flowing through the sample fluid introduction flow channel and the sheath fluid introduction flow channels join and flow; a negative pressure suction unit in communication with the junction flow channel, the negative pressure suction unit sucking and drawing a microparticle to be collected; and at least one pair of waste flow channels provided on two sides of the negative pressure suction unit and in communication with the junction flow channel" (claim 1). In the microchip, target microparticles are collected into the negative pressure suction unit by suction.

Furthermore, Patent Document 2 below describes "a microparticle separation method including a procedure of incorporating a microparticle in a liquid flowing through a main flow channel into a branch flow channel by generating a negative pressure in the branch flow channel in communication with the main flow channel, in which, in the procedure, a flow of liquid advancing from a side of the branch flow channel to a side of the main flow channel is formed in a communication port between the main flow channel and the branch flow channel" (claim 1). In the separation method, the flow of liquid advancing to the main flow channel side suppresses the ingress of non-target particles or a sample fluid and a sheath fluid containing the non-target particles into a separation flow channel during a non-separation operation. In addition, Patent Document 2 below also describes a microparticle separation microchip capable of carrying out the microparticle separation method (claim 9).

CITATION LIST

Patent Document

Patent Document 1: Japanese Patent Application Laid-Open No. 2012-127922
Patent Document 2: Japanese Patent Application Laid-Open No. 2014-36604

SUMMARY OF THE INVENTION

Problems to be Solved by the Invention

In the technology for separating target microparticles in a microchip, for example, target microparticles can be sucked into the particle separation flow channel as described above by negative pressure. In a case where the liquid does not contain the target microparticles, no suction is performed. For this reason, it is necessary to optimize the timing at which suction is performed, in order to enhance the microparticle separation performance.

The present technology aims to optimize the timing at which suction is performed, in order to enhance the microparticle separation performance in a technology for separating target microparticles in a microchip.

Solutions to Problems

The inventors of the present invention have found that the above-mentioned problems can be solved by a specific method.

In other words, the present technology provides
a method of optimizing a microparticle suction condition, using a microchip having a main flow channel through which a liquid containing a microparticle flows, a microparticle suction flow channel arranged coaxially with the main flow channel, and a branch flow channel branching from the main flow channel, the method including:
a branch point specifying process of specifying a branch point at which the branch flow channel branches from the main flow channel; and
a time assignment process of assigning a time $T_1$ to be applied to suction of the microparticle, on the basis of a distance between a position of the microparticle and the branch point at a time point when a predetermined time $T_X$ has elapsed from a time when the microparticle passed through a predetermined position on the main flow channel.

The Method May Include
a distance calculation process of calculating the distance, in which
the time assignment process may perform the distance calculation process a plurality of times while modifying the time $T_X$, and may set a time in a case where the distance is shortest as the $T_1$.

The Method May Include:

a suction process of sucking the microparticle by a suction force $D_X$ to separate the microparticle into the microparticle suction flow channel at a time point when the time $T_1$ has elapsed from a time when the microparticle passed through the predetermined position;

a suction force specifying process of modifying the suction force $D_X$ to a smaller suction force to repeat the suction process until the microparticle is no longer separated into the microparticle suction flow channel, and specifying a suction force $D_1$ at an end time point of the repetition; and a suction force assignment process of setting a suction force $D_2$ increased from the $D_1$ at a predetermined rate, as a suction force to be applied to suction of the microparticle.

The branch point specifying process may include: a trajectory image acquisition process of acquiring a fluorescence image indicating a trajectory of a microparticle flowing through the main flow channel and the branch flow channel by continuous light emission;

an image extraction process of dividing the fluorescence image into a plurality of blocks to binarize the divided blocks, and extracting a block including an image of the trajectory; and a branch point acquisition process of specifying an end block corresponding to an end portion of the main flow channel from among the blocks including images of the trajectory, and setting a barycentric position of an image of the end block as the branch point.

The Method May Include:

a microparticle image acquisition process of acquiring a strobe image of the microparticle at the time $T_X$ by pulse light emission; and a position acquisition process of setting a barycentric position of the strobe image of the microparticle as a position of the microparticle, in which the distance calculation process may use the position of the microparticle obtained in the position acquisition process.

The Method May Include:

a microparticle image acquisition process of acquiring a strobe image of the microparticle at the time $T_1$ by pulse light emission; and a position acquisition process of setting a barycentric position of the strobe image of the microparticle as a position of the microparticle, in which the suction force specifying process may determine whether or not the microparticle has been separated, on the basis of the position of the microparticle obtained in the position acquisition process.

The Method May Include:

an irradiation process of forming a plurality of beam spots at different positions on the main flow channel;

a speed calculation process of calculating speed of the microparticle on the basis of a distance between any beam spots and a time during which the microparticle passes through the distance; and a time calculation process of setting a time calculated on the basis of a distance from the predetermined position and the speed, as the time $T_X$.

Furthermore, the present technology provides a microparticle separation device including:

a microchip having a main flow channel through which a liquid containing a microparticle flows, a microparticle suction flow channel arranged coaxially with the main flow channel, and a branch flow channel branching from the main flow channel;

a branch point specifying unit that specifies a branch point at which the branch flow channel branches from the main flow channel; and a time assignment unit that assigns a time $T_1$ to be applied to suction of the microparticle, on the basis of a distance between a position of the microparticle and the branch point at a time point when a predetermined time $T_X$ has elapsed from a time when the microparticle passed through a predetermined position on the main flow channel.

Effects of the Invention

According to the present technology, the timing at which suction is performed is optimized in the technology for separating target microparticles in the microchip. As a result, the microparticle separation performance is enhanced.

Note that the effects exhibited by the present technology are not necessarily limited to the ones described herein and any effects described in the present description may be applied.

MODE FOR CARRYING OUT THE INVENTION

Hereinafter, preferred modes for carrying out the present technology will be described with reference to the drawings. Note that embodiments described below indicate representative embodiments of the present technology, and the scope of the present technology is not narrowly interpreted by these embodiments. The description will be given in the following order.

Figure 1:
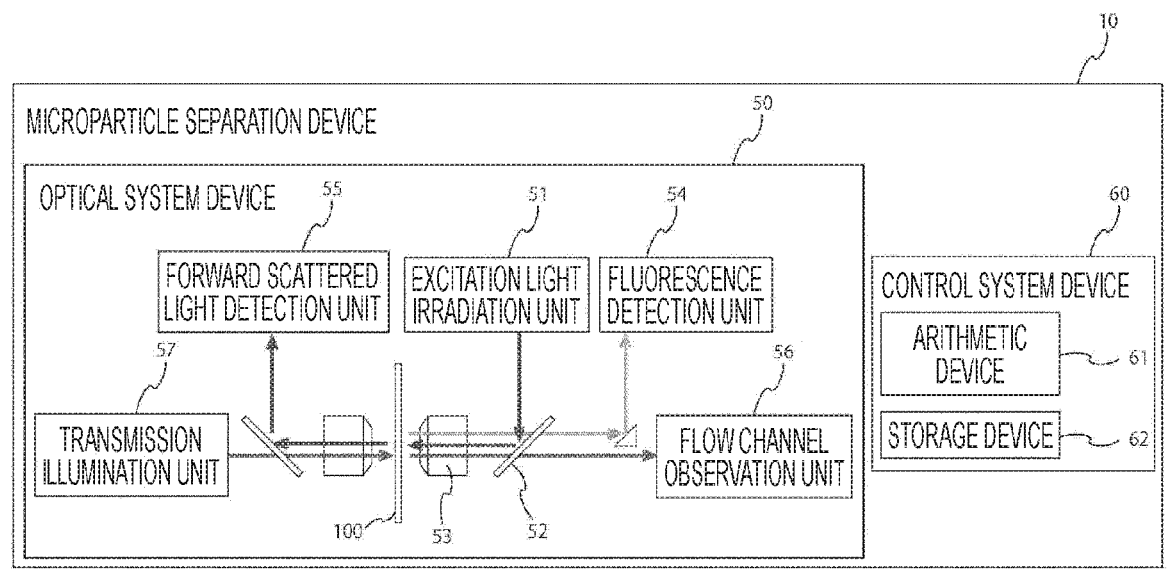
FIG. 1 is a diagram illustrating an example of the physical configuration of a microparticle separation device.

1. Configuration of Microparticle Separation Device
 (1) Physical Configuration
 (2) Functional Configuration 2. Operation of Microparticle Separation Device
(1) Optimization of Suction Timing
(2) Optimization of Suction Force
1. Configuration of Microparticle Separation Device
(1) Physical Configuration FIG. 1 is a diagram illustrating an example of the physical configuration of a microparticle separation device 10. The microparticle device 10 includes an optical system device 50 and a control system device 60. The optical system device 50 can include, for example, a microchip 100, an excitation light irradiation unit 51, a fluorescence detection unit 54, a forward scattered light detection unit 55, a flow channel observation unit 56, a transmission illumination unit 57, and the like. The control system device 60 can include, for example, an arithmetic device 61, a storage device 62, and the like.

The microchip 100 has a main flow channel through which a liquid containing a microparticle flows, a microparticle suction flow channel arranged coaxially with the main flow channel, and a branch flow channel branching from the main flow channel. When microparticles to be collected flow through the main flow channel, the microparticles are sucked in the microparticle suction flow channel. Other microparticles run to the branch flow channel. Details of the microchip 100 will be described later.

The excitation light irradiation unit 51 includes a light source that irradiates the microparticles flowing through the main flow channel of the microchip with excitation light. The light source is configured from, for example, a laser diode and the like. The excitation light radiated from the light source and passing through a dichroic mirror 52, an objective lens 53, and the like forms a beam spot on the main flow channel of the microchip 100.

The fluorescence detection unit 54 detects fluorescence generated from the microparticles irradiated with the excitation light. The fluorescence detection unit 54 is configured from, for example, an area imaging device such as a photomultiplier tube (PMT), a charge coupled device (CCD), or a complementary metal oxide semiconductor (CMOS) device and the like. The forward scattered light detection unit 55 detects forward scattered light generated from the microparticles irradiated with the excitation light. The forward scattered light detection unit 55 is configured from, for example, a light detector such as a photodiode and the like.

The flow channel observation unit 56 includes a camera that images a certain region (separation portion) including a portion where the main flow channel, the microparticle suction flow channel, and the branch flow channel on the microchip 100 intersect. The transmission illumination unit 57 irradiates the entire field of view of the objective lens with light.

Figure 2:
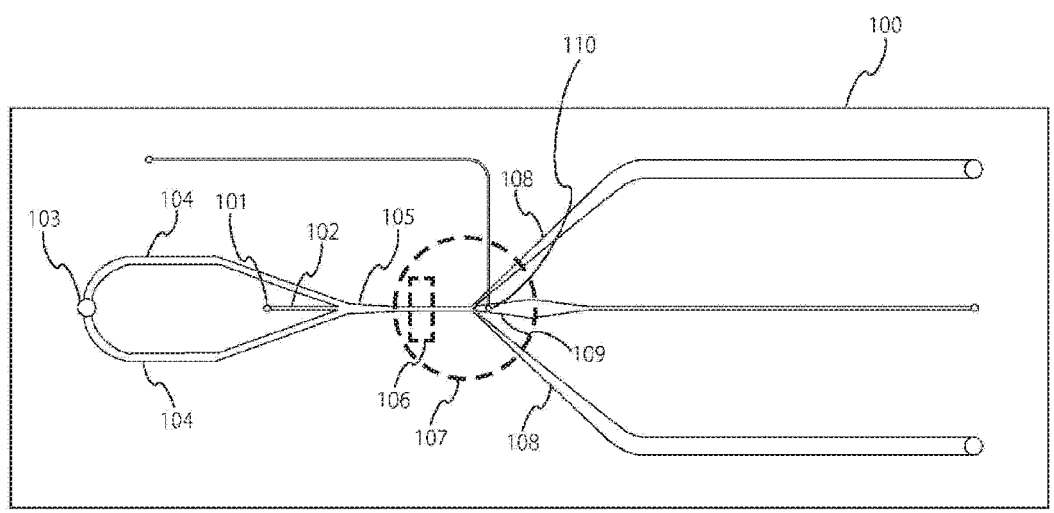
FIG. 2 is a schematic diagram illustrating a configuration example of a microchip.

Next, the microchip 100 will be described with reference to FIG. 2. FIG. 2 is a schematic diagram illustrating a configuration example of the microchip 100.

The microchip 100 is provided with a sample fluid inlet 101 and a sheath fluid inlet 103. A sample fluid and a sheath fluid are introduced into a sample fluid flow channel 102 and a sheath fluid flow channel 104 from these inlets, respectively. The sample fluid contains microparticles.

The sheath fluid running through the sheath fluid flow channel 104 joins with the sample fluid running through the sample fluid flow channel 102 to form a laminar flow in which the sample fluid is surrounded by the sheath fluid. The laminar flow runs in a main flow channel 105 toward the separation portion 107.

In the separation portion 107, the laminar flow that has run through the main flow channel 105 runs to branch flow channels 108 branched from the main flow channel 105. Furthermore, in the separation portion 107, only in a case where the microparticles to be collected run down, a flow to a microparticle suction flow channel 109 arranged coaxially with the main flow channel 105 is formed and the microparticles are collected. When the microparticles are withdrawn into the microparticle suction flow channel 109, the sample fluid and/or the sheath fluid constituting the laminar flow can also run into the microparticle suction flow channel 109.

A gate flow inlet 110 may be equipped to prevent microparticles supposed not to be collected from entering the microparticle suction flow channel 109. The sheath fluid is introduced from the gate flow inlet 110 to form a flow in a direction from the microparticle suction flow channel 109 to the main flow channel 105, whereby microparticles supposed not to be collected are prevented from entering the microparticle suction flow channel 109.

The separation portion 107 has a detection region 106. In the detection region 106, the microparticles running in the main flow channel 105 are irradiated with light from the excitation light irradiation unit, and whether or not the microparticles are supposed to be collected can be found out by scattered light and/or fluorescence produced as a result of the irradiation.

Figure 3:
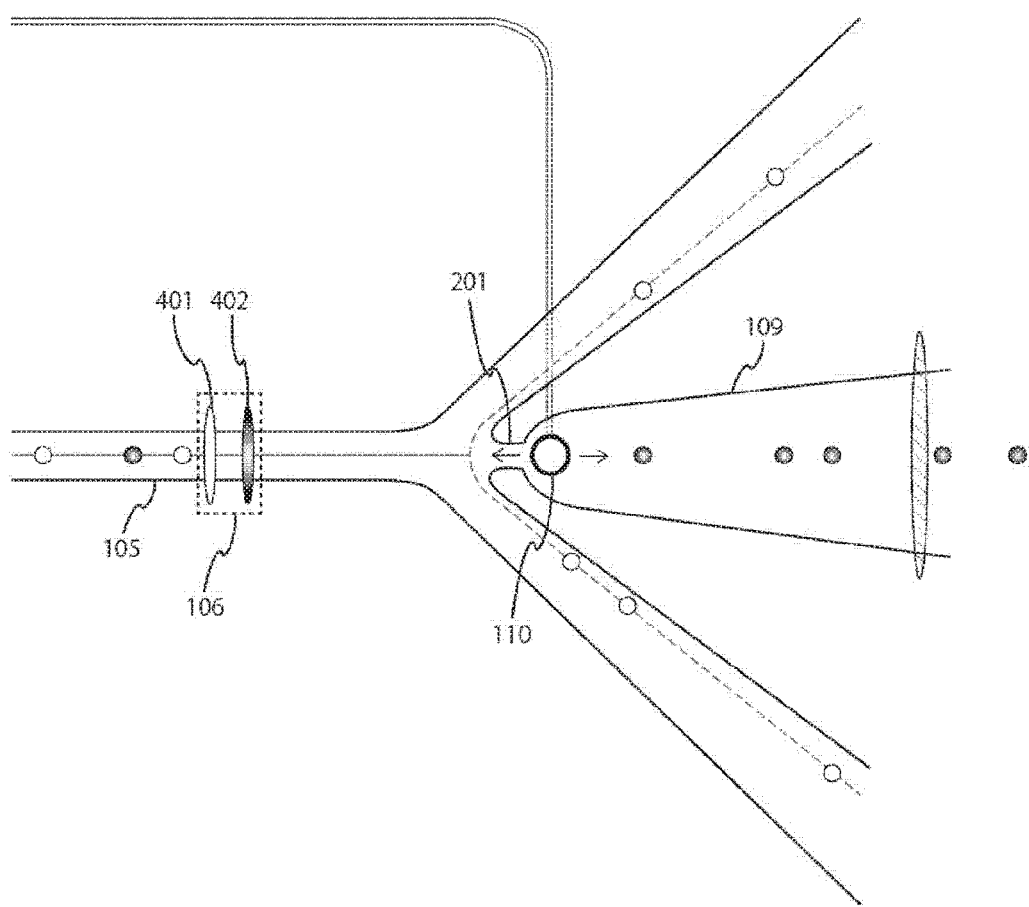
FIG. 3 is an enlarged diagram of a separation portion.

An enlarged diagram of the separation portion 107 is illustrated in FIG. 3. As illustrated in FIG. 3, the main flow channel 105 and the microparticle suction flow channel 109 are in communication with each other via an orifice portion 201 arranged coaxially with the main flow channel 105. The microparticles to be collected run through the orifice portion 201 to the microparticle suction flow channel 109. Furthermore, in order to prevent microparticles supposed not to be collected from entering the microparticle suction flow channel 109 through the orifice portion 201, the orifice portion 201 is equipped with the gate flow inlet 110. The sheath fluid is introduced from the gate flow inlet 110 to form a flow advancing from the orifice portion 201 to the main flow channel 105, whereby microparticles supposed not to be collected are prevented from entering the microparticle suction flow channel 109.

In a microchip having such a flow channel structure, a flow proceeding from the main flow channel 105 to the microparticle suction flow channel 109 through the orifice portion 201 (hereinafter, referred to as "flow at the time of microparticle collection) is formed in a case where microparticles are collected. The flow is not formed except a case where the microparticles are collected. For example, the sheath fluid introduced from the gate flow inlet 110 can form a flow advancing from the orifice portion 201 to the main flow channel 105 except a case where the microparticles are collected.

The flow at the time of microparticle collection can be formed by applying a negative pressure to the microparticle suction flow channel 109. In other words, by applying a negative pressure to the microparticle suction flow channel 109, the microparticles are sucked into the microparticle suction flow channel 109.

The microparticle separation device of the present technology can include an actuator (not illustrated) to generate a negative pressure in the microparticle suction flow channel. For example, a piezoelectric device is only required to be utilized as the actuator. The actuator is in contact with a surface of the microchip and is disposed at a position corresponding to the microparticle suction flow channel. The actuator expands and contracts in line with a change in applied voltage, and produces a change in pressure in the microparticle suction flow channel via the surface of the microchip. The actuator presses the microparticle suction flow channel while the voltage is applied and the actuator is extended, and maintains the volume in the microparticle suction flow channel small. When the applied voltage decreases, the actuator generates a force in a direction of contraction; accordingly, the pressure on the microparticle suction flow channel weakens, and a negative pressure is generated in the microparticle suction flow channel.

The physical configuration will be further described with reference to FIG. 1 again. The microparticle separation device 10 includes the control system device 60. The control system device 60 is configured from one or two or more computers. The computer includes hardware such as the arithmetic device 61 and the storage device 62. The arithmetic device 61 is configured from a central processing unit (CPU), a read only memory (ROM), a random access memory (RAM), and the like. The CPU implements control and functions of the entire microparticle separation device 10 by calling a program or data from the storage device 62, the ROM, or the like onto the RAM and executing processing. The ROM is a non-volatile memory and retains programs and data such as basic input/output system (BIOS) and operating system (OS) settings and various settings. The RAM is a volatile memory and temporarily holds programs and data. The storage device 62 is, for example, a hard disk drive, and retains a program executed by the arithmetic device 61 and data necessary for program execution. The microparticle separation device 10 of the present technology implements various types of processing described later by the above-described physical configuration.

(2) Functional Configuration

Figure 4:
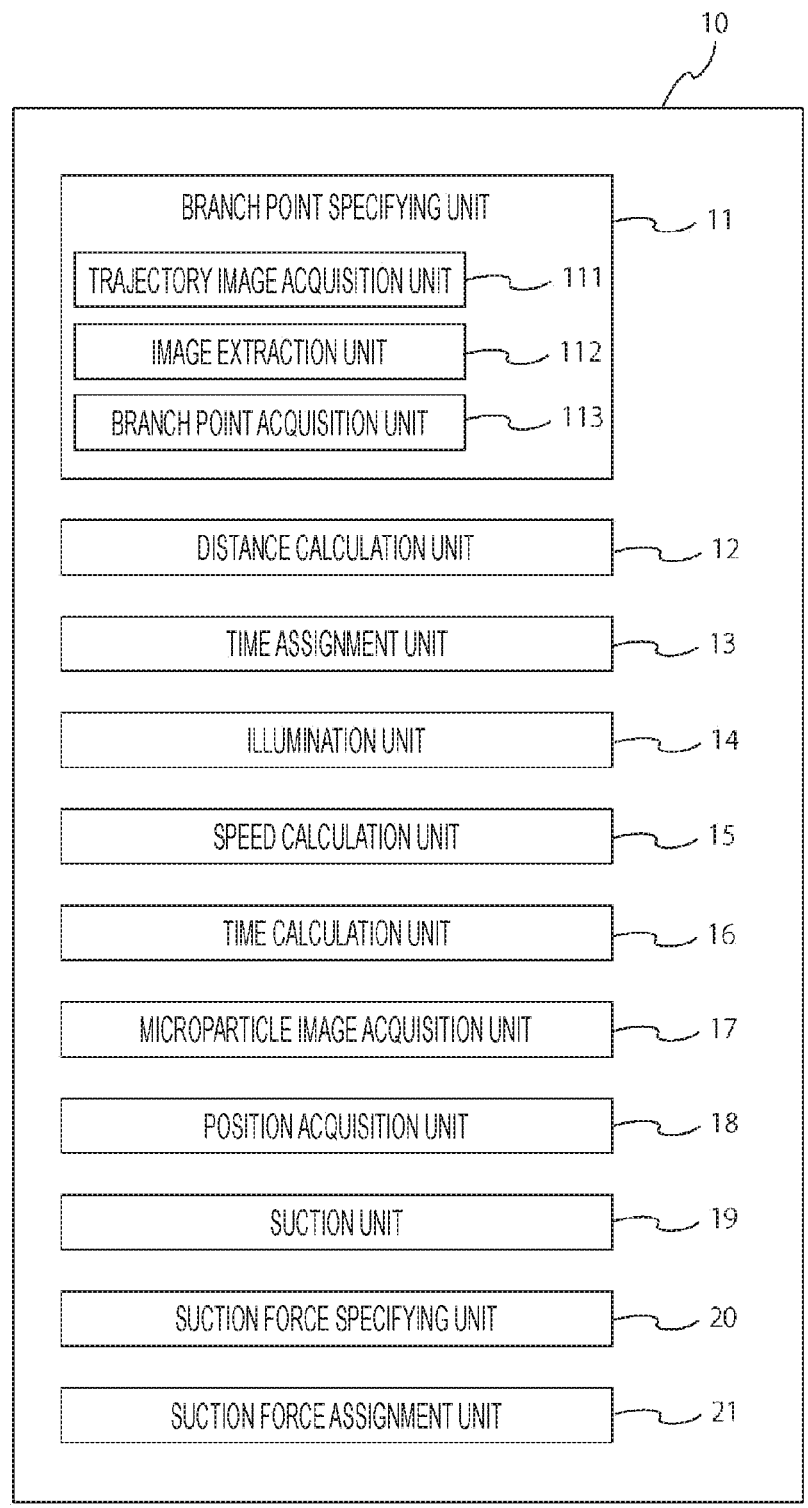
FIG. 4 is a diagram illustrating an example of the functional configuration of the microparticle separation device.

Next, the functional configuration of the microparticle separation device will be described with reference to FIG. 4. FIG. 4 is a diagram illustrating an example of the functional configuration of the microparticle separation device 10. The microparticle separation device 10 includes a branch point specifying unit 11 and a time assignment unit 13. The branch point specifying unit 11 is implemented by the optical system device 50, the control system device 60, and the like. The time assignment unit 13 is implemented by the control system device 60 and the like.

The branch point specifying unit 11 may include a trajectory image acquisition unit 111, an image extraction unit 112, and a branch point acquisition unit 113. The trajectory image acquisition unit 111 is implemented by the optical system device 50 and the like. The image extraction unit 112 and the branch point acquisition unit 113 are implemented by the control system device 60 and the like.

The microparticle separation device 10 may include a distance calculation unit 12, an illumination unit 14, a speed calculation unit 15, and a time calculation unit 16. The illumination unit 14 is implemented by the excitation light irradiation unit 51 of the optical system device 50, and the like. The distance calculation unit 12, the speed calculation unit 15, and the time calculation unit 16 are implemented by the control system device 60 and the like.

The microparticle separation device 10 may include a microparticle image acquisition unit 17 and a position acquisition unit 18. The microparticle image acquisition unit 17 is implemented by the optical system device 50 and the like. The position acquisition unit 18 is implemented by the control system device 60 and the like.

The microparticle separation device 10 may include a suction unit 19, a suction force specifying unit 20, and a suction force assignment unit 21. The suction unit 19 is implemented by the actuator, the control system device 60, and the like. The suction force specifying unit 20 and the suction force assignment unit 21 are implemented by the control system device 60 and the like.

2. Operation of Microparticle Separation Device (1) Optimization of Suction Timing As described above, by applying a negative pressure to the microparticle suction flow channel of the microchip, the microparticles are sucked into the microparticle suction flow channel. The suction of the microparticles is performed at a time point when a predetermined time has elapsed since the particles passed through a predetermined detection region, in a case where it is found out in the predetermined detection region that the microparticles are supposed to be collected. For more accurate microparticle separation, it is necessary to optimize what amount of time is to elapse until the time point when the suction is advantageously performed.

As a method of adjusting the time when the suction is advantageously performed, for example, it is conceivable to use a high-speed camera or the like to capture a moving image of the situation in which the microparticles are separated, and adjust the time when the suction is advantageously performed, on the basis of the moving image. However, this method is not desirable because an expensive high-speed camera and software for performing the method are required. For this reason, there is a need to develop a new method to assign at what time point the suction is advantageously performed.

Furthermore, the microchip mounted on the microparticle separation device of the present technology can be exchanged for each experiment or for each specimen to be analyzed. By exchanging the microchips, contamination between specimens can be avoided. However, exchanging the microchips can produce changes in the position where the microparticles are detected in the detection region and/or the length of the flow channel, or the like. Therefore, in a case where a new microchip is mounted, it is necessary to optimize the time point when the suction of microparticles is advantageously performed, for more accurate microparticle separation. Furthermore, it is desirable that such optimization be performed automatically.

As described above, in the technology for separating target microparticles in a microchip, a new method is required to automatically optimize the timing for sucking the microparticles. The present technology provides a new method of automatically optimizing the suction timing for microparticles. Specifically, the present technology provides a method of optimizing a microparticle suction condition using a microchip having a main flow channel through which a liquid containing a microparticle flows, a microparticle suction flow channel arranged coaxially with the main flow channel, and a branch flow channel branching from the main flow channel.

Hereinafter, a method of optimizing the suction timing for microparticles will be described. The method is executed by the microparticle separation device 10 described above.

Figure 5:
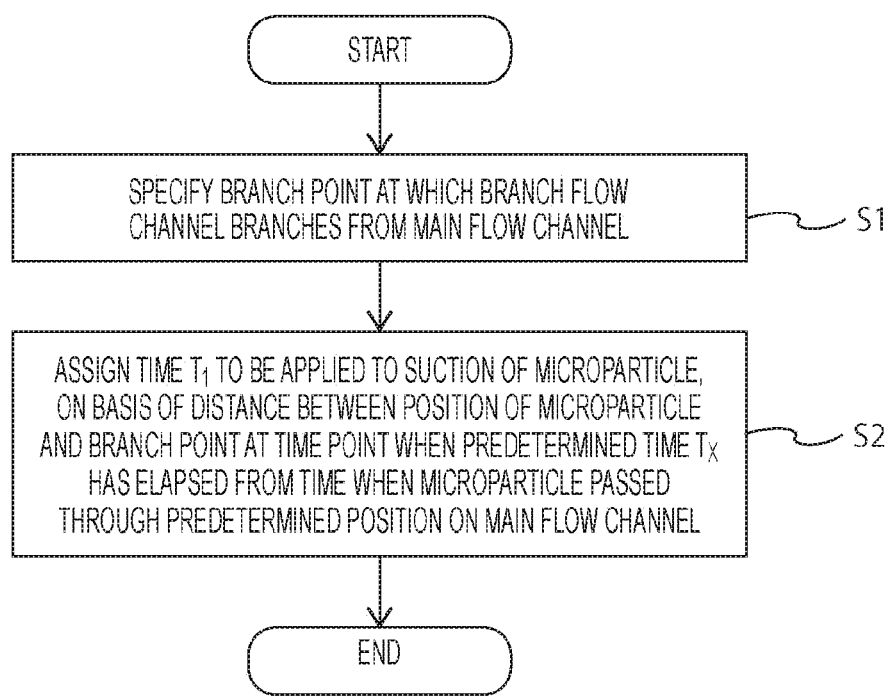
FIG. 5 is a flowchart illustrating an example of processing executed by the microparticle separation device.

FIG. 5 is a flowchart illustrating an example of processing executed by the microparticle separation device 10. First, the branch point specifying unit 11 executes a branch point specifying process of specifying a branch point at which the branch flow channel branches from the main flow channel (step S1). Next, the time assignment unit 13 executes a time assignment process of assigning a time $T_1$ to be applied to the suction of a microparticle, on the basis of a distance between the position of the microparticle and the branch point at a time point when a predetermined time $T_X$ has elapsed from a time when the microparticle passed through a predetermined position on the main flow channel (step S2).

The timing at which the distance between the microparticle flowing through the main flow channel and the branch point is shorter and the microparticle is closer to the branch point is more suitable for the suction of the microparticle. By performing the above-described processing, it is possible to select a timing suitable for the suction of the microparticle and to suck the microparticle.

Figure 6:
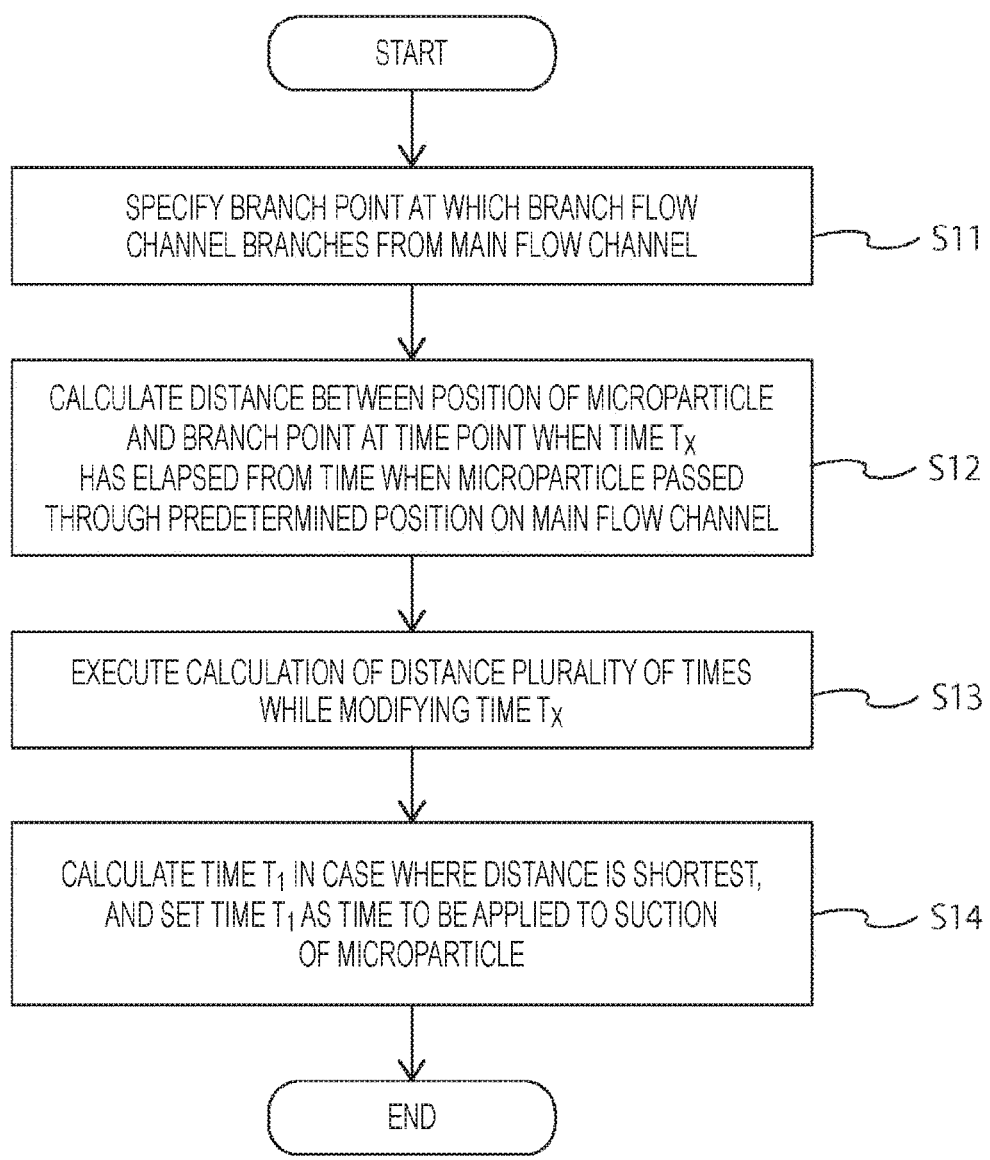
FIG. 6 is a flowchart illustrating an example of processing executed by the microparticle separation device.

Next, another example of processing performed by the microparticle separation device 10 will be described with reference to FIG. 6. FIG. 6 is a flowchart illustrating an example of processing executed by the microparticle separation device 10.

First, the branch point specifying unit 11 executes a branch point specifying process of specifying a branch point at which the branch flow channel branches from the main flow channel (step S11). Next, the distance calculation unit 12 executes a distance calculation process of calculating a distance between the position of a microparticle and the branch point at a time point when the time $T_X$ has elapsed from a time when the microparticle passed through a predetermined position on the main flow channel (step S12). The distance calculation process is executed a plurality of times while modifying the time $T_X$ (step S13). The time assignment unit 13 executes a time assignment process of calculating a time $T_1$ in a case where the obtained distance is shortest, and setting the time $T_1$ as a time to be applied to the suction of the microparticle (step S14).

As described above, the microparticle separation device 10 can include the distance calculation process. Furthermore, in the time assignment process, the microparticle separation device 10 can modify the time $T_X$ to perform the distance calculation process a plurality of times, and set a time in a case where the distance is shortest, as the $T_1$. With such processing, it is possible to suck the microparticle at a timing when the microparticle flowing through the main flow channel is closest to the branch point, in other words, the timing most suitable for the suction of the microparticle.

Figure 7:
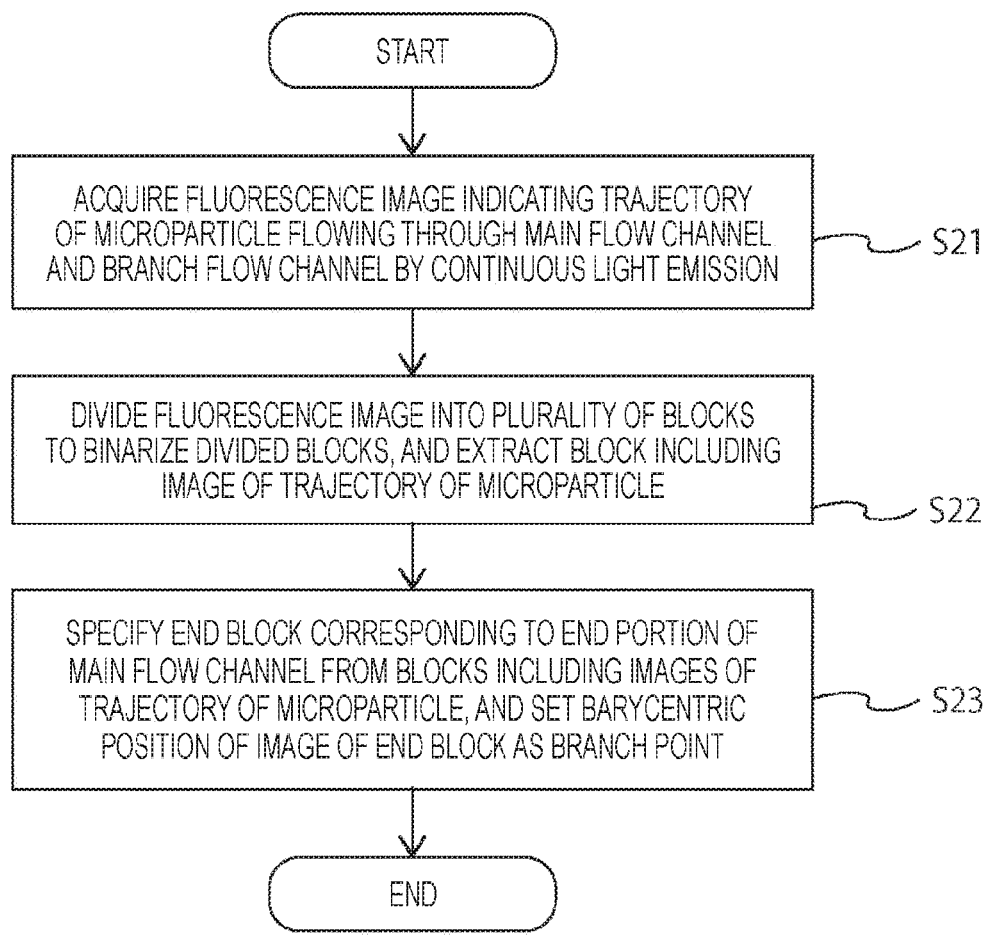
FIG. 7 is a flowchart illustrating an example of processing in a branch point specifying process.

Next, an example of processing that can be included in the branch point specifying process will be described with reference to FIG. 7. FIG. 7 is a flowchart illustrating an example of processing in the branch point specifying process.

The trajectory image acquisition unit 111 executes a trajectory image acquisition process of acquiring a fluorescence image indicating a trajectory of a microparticle flowing through the main flow channel and the branch flow channel by continuous light emission (step S21). The light source of continuous light emission can be the transmission illumination unit 57 of the optical system device 50. The fluorescence image indicating the trajectory of the microparticle can be acquired by the flow channel observation unit 56 of the optical system device 50. Next, the image extraction unit 112 executes an image extraction process of dividing the fluorescence image into a plurality of blocks to binarize the divided blocks, and extracting a block including an image of the trajectory (step S22). The branch point acquisition unit 113 executes a branch point acquisition process of specifying an end block corresponding to an end portion of the main flow channel from among the blocks including images of the trajectory, and setting a barycentric position of an image of the end block as the branch point (step S23).

Figure 8:
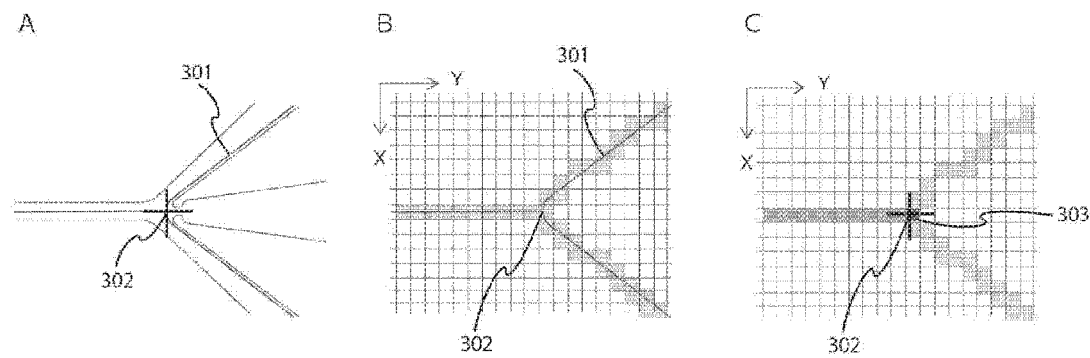
FIGS. 8A, 8B, and 8C are diagrams illustrating an example of a fluorescence image indicating the trajectory of a microparticle.

Next, an example of processing in the trajectory image acquisition unit 111, the image extraction unit 112, and the branch point acquisition unit 113 will be further described with reference to FIGS. 8A, 8B, and 8C. FIGS. 8A, 8B, and 8C are diagrams illustrating an example of the fluorescence image indicating the trajectory of a microparticle.

FIG. 8A is a fluorescence image indicating a trajectory 301 of a microparticle flowing through the main flow channel. The trajectory image acquisition unit 111 continuously emits transmission illumination (performs direct current (DC) light emission) from the transmission illumination unit 57, and acquires the trajectory 301 of the microparticle as a fluorescence image by a camera of the flow channel observation unit 56. The intersection point of the trajectory 301 of the microparticle represents a branch point 302.

FIG. 8B is a diagram illustrating a state in which blocks including images of the trajectory are extracted from the fluorescence image. The image extraction unit 112 divides the fluorescence image into a plurality of blocks to binarize the divided blocks, and extracts a block including an image of the trajectory 301 of the microparticle from among the plurality of blocks. Assuming that a direction orthogonal to the main flow channel is an X axis and a direction parallel to the main flow channel is a Y axis in the fluorescence image, it is possible to specify any position on the fluorescence image by coordinates (X, Y).

FIG. 8C is a diagram illustrating a state in which the branch point 302 is specified. The branch point acquisition unit 113 specifies an end block 303 corresponding to the end of the main flow channel from among the blocks including the trajectory 301 of the microparticle, which have been extracted by the image extraction unit 112. The end block 303 can be specified as a block including an image of the trajectory 301 of the microparticle and located most downstream among blocks continuous in the Y-axis direction. The branch point acquisition unit 113 can set the coordinates ($X_S$, $Y_S$) of the barycentric position of the image of the end block 303 as the branch point 302.

Figure 9:
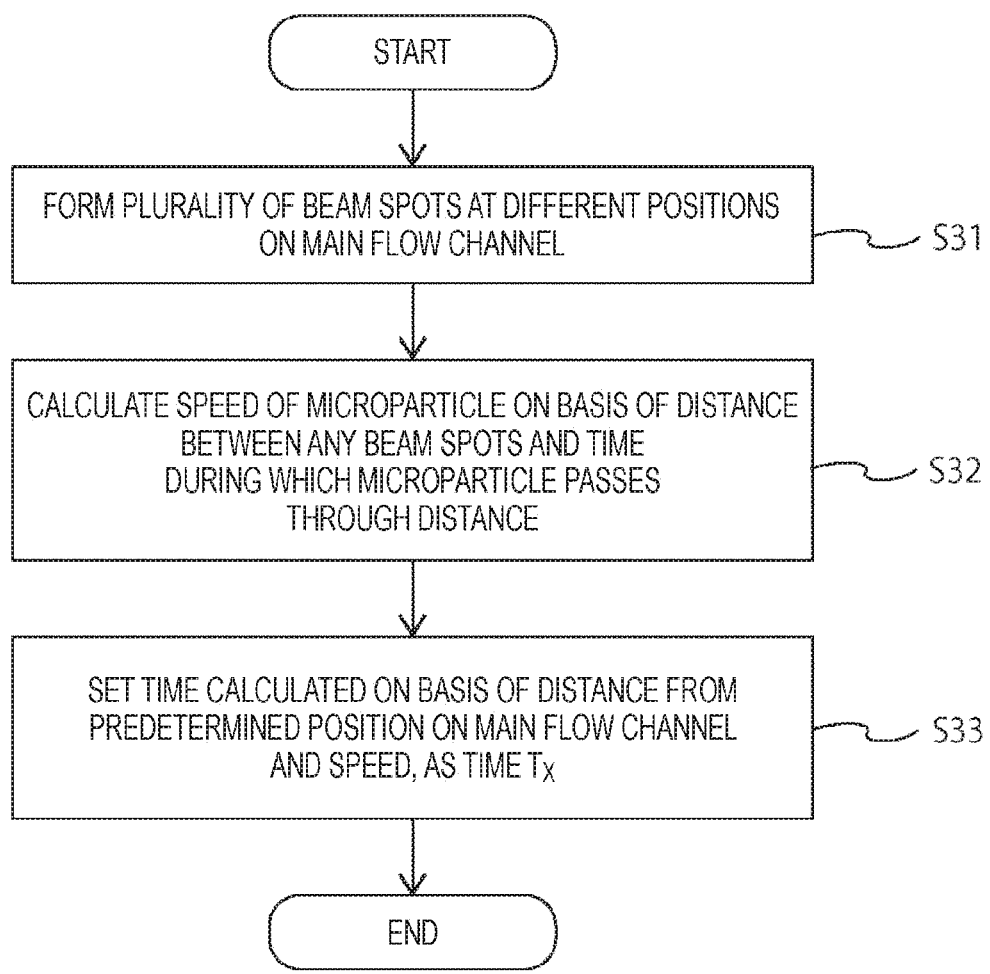
FIG. 9 is a flowchart illustrating an example of processing of calculating a time TX.

Next, an example of a method of calculating the elapsed time $T_X$ from a time when the microparticle passed through a predetermined position on the main flow channel, which is used in the above-described distance calculation process, will be described with reference to FIG. 9. FIG. 9 is a flowchart illustrating an example of processing of calculating the time $T_X$.

The illumination unit 14 executes an irradiation process of forming a plurality of beam spots at different positions on the main flow channel (step S31). The speed calculation unit 15 executes a speed calculation process of calculating the speed of a microparticle on the basis of a distance between any beam spots and a time during which the microparticle passes through the distance (step S32). The time calculation unit 16 executes a time calculation process of setting a time calculated on the basis of a distance from the predetermined position on the main flow channel and the speed, as the time $T_X$ (step S33).

The predetermined position on the main flow channel can be set as the position of the beam spot formed on the main flow channel by the light from the excitation light irradiation unit 51. The predetermined position on the main flow channel will be further described with reference to FIG. 3 again. As illustrated in FIG. 3, for example, two beam spots 401 and 402 can be formed perpendicular to the traveling direction of the microparticles in the detection region 106. Two rays of excitation light forming the beam spots may have the same or different wavelengths. The predetermined position on the main flow channel 105 may be, for example, the position of the beam spot 402 on the side of the microparticle suction flow channel 109 among the two beam spots, or may be the position of the other beam spot 401. The passage of microparticles can be detected by the generation of scattered light and/or fluorescence as the microparticles pass through the beam spot.

Figure 10:
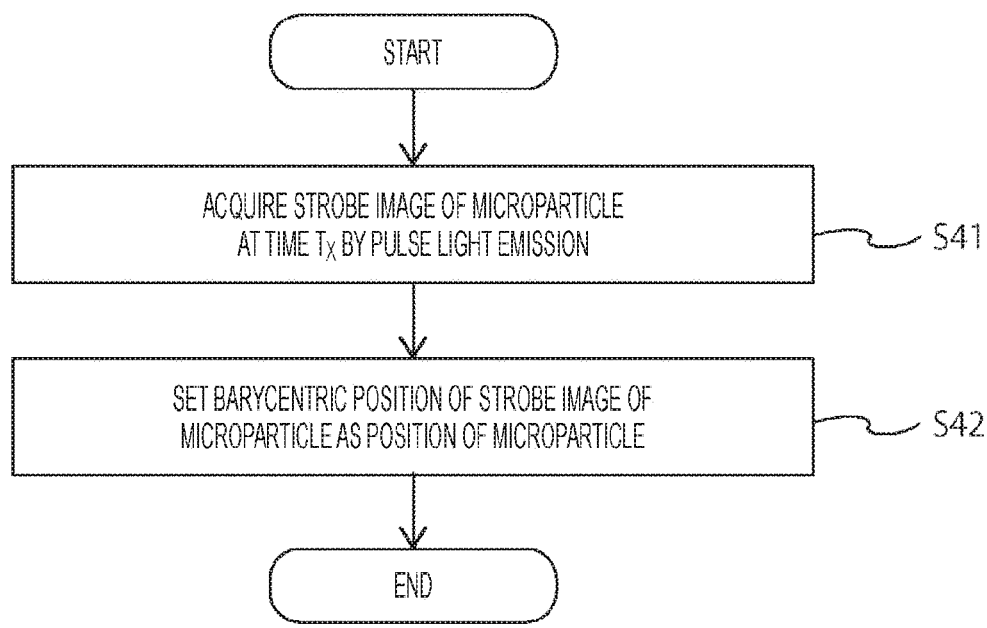
FIG. 10 is a flowchart illustrating an example of processing of specifying the position of a microparticle.

Next, an example of a method of specifying the position of a microparticle at a time point when the time $T_X$ has elapsed from a time when the microparticle passed through a predetermined position on the main flow channel, which is used in the above-described distance calculation process, will be described with reference to FIG. 10. FIG. 10 is a flowchart illustrating an example of processing of specifying the position of a microparticle.

The microparticle image acquisition unit 17 executes a microparticle image acquisition process of acquiring a strobe image of a microparticle at the time $T_X$ by pulse light emission (step S41). The position acquisition unit 18 executes a position acquisition process of setting a barycentric position of the strobe image of the microparticle as the position of the microparticle (step S42).

For example, assuming that a direction orthogonal to the main flow channel is an X axis and a direction parallel to the main flow channel is a Y axis in the strobe image, the position acquisition unit 18 can specify the position of the microparticle on the strobe image by coordinates (X, Y).

Figure 11A:
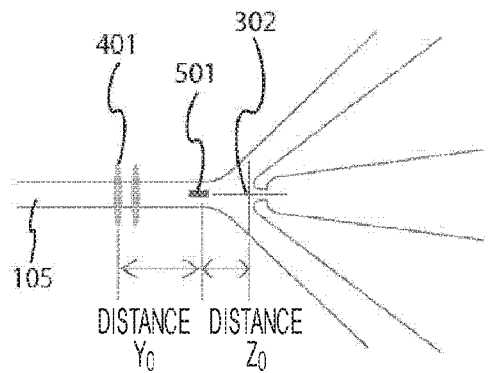
FIGS. 11A and 11B are diagrams illustrating an example of a strobe image of a microparticle.
Figure 11B:
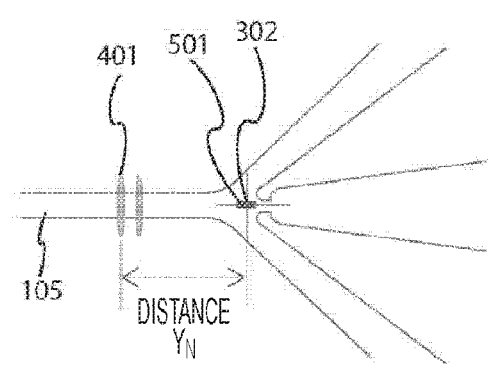

Next, an example of processing in the distance calculation process and the time assignment process will be described with reference to FIGS. 11A, 11B, and 11C. FIGS. 11A, 11B, and 11C are diagrams illustrating an example of a strobe image of a microparticle 501.

FIG. 11A is a diagram illustrating a strobe image of the microparticle 501 at a time $T_0$. The microparticle image acquisition unit 17 performs pulse light emission of the transmission illumination from the transmission illumination unit 57 at a timing when the time $T_0$ has elapsed from a time when the microparticle 501 passed through a predetermined position 401 on the main flow channel 105, and acquires a strobe image of the microparticle 501 at the time $T_0$ by a camera of the flow channel observation unit 56. In the example in FIG. 11A, the microparticle 501 at the time $T_0$ is located between the predetermined position 401 on the main flow channel 105 and the branch point 302, and is located at a position away from the predetermined position 401 by a distance $Y_0$. The distance calculation unit 12 calculates a distance $Z_0$ between the position of the microparticle 501 and the branch point 302. The distance calculation unit 12 performs the distance calculation process of calculating a distance $Z_X$ between the position of the microparticle 501 and the branch point 302 while modifying the time $T_X$, a plurality of times.

FIG. 11B is a diagram illustrating a strobe image of the microparticle 501 at a time $T_N$. In the example in FIG. 11B, since the position of the microparticle 501 at the time $T_N$ overlaps the branch point 302, a distance $Z_N$ between the position of the microparticle 501 and the branch point 302 at the time $T_N$ is obtained as zero. The time assignment unit 13 calculates that the time $T_X$ in a case where the distance $Z_X$ is shortest is the time $T_N$, and assigns this time $T_N$ as a time to be applied to the suction of the microparticle.

In the present technology, microparticles may be appropriately selected by those skilled in the art. In the present technology, microparticles can include, for example, biological microparticles such as cells, microorganisms, and liposomes, and synthetic particles such as latex particles, gel particles, and industrial particles. Biological microparticles can include chromosomes, liposomes, mitochondria, organelles (cellular organelles), and the like, which constitute various cells. Cells can include animal cells (such as blood cells) and plant cells. Microorganisms can include bacteria such as coliforms, viruses such as tobacco mosaic virus, fungi such as yeast, and the like. Moreover, biological microparticles can also include biological macromolecules such as nucleic acids, proteins, and complexes thereof. Furthermore, synthetic particles can be particles made up of, for example, an organic or inorganic polymer material, a metal, or the like. Organic polymer materials can include polystyrene, styrene divinyl benzene, polymethyl methacrylate, and the like. Inorganic polymer materials can include glass, silica, magnetic materials, and the like. Metals may include gold colloids, aluminum, and the like. The shape of the microparticle may be generally spherical or nearly spherical or may be non-spherical. The dimensions and mass of the microparticle can be appropriately selected by those skilled in the art depending on the size of the flow channel of the microchip. Meanwhile, the size of the flow channel of the microchip can also be appropriately selected depending on the dimensions and mass of the microparticle. In the present technology, the microparticle may be attached with a chemical or biological label, such as a fluorescent dye, as needed, for example. The label can make the detection of the microparticle easier. The label to be attached can be appropriately selected by those skilled in the art.

The microchip of the present technology can be manufactured by methods known in the technical field of the present technology. For example, the microchip of the present technology can be manufactured, for example, by bonding two substrates in which the flow channels as described above are formed. The flow channel may be formed in both of the two substrates, or may be formed in only one of the substrates. In order to make position adjustment at the time of bonding the substrates easier, it is more preferable that the flow channels be formed only in one of the substrates.

Materials known in the technical field can be used as a material for forming the microchip of the present technology. Examples of the materials include, but are not limited to, polycarbonate, cycloolefin polymers, polypropylene, polydimethylsiloxane (PDMS), polymethylmethacrylate (PMMA), polyethylene, polystyrene, glass, and silicon. In particular, polymer materials such as polycarbonate, cycloolefin polymers, and polypropylene are especially preferable because these materials are excellent in processability and the microchip can be inexpensively manufactured from these materials using a molding device.

(2) Optimization of Suction Force

In a case where microparticles are sucked into the microparticle suction flow channel, the sample fluid and/or the sheath fluid is sucked into the microparticle suction flow channel together with the microparticles. In a case where the applied suction force is too large, it is not desirable because the amount of the sample fluid and/or sheath fluid sucked into the microparticle suction flow channel together with the microparticles is raised and the density of the collected microparticles is lowered. On the other hand, in a case where the applied suction force is too small, the possibility of the microparticles not being collected is heightened. Therefore, it is desirable to optimize the applied suction force as well. The method of optimizing the microparticle suction condition according to the present technology also provides a method of automatically optimizing the suction force.

Hereinafter, a method of optimizing the suction force will be described. The method of optimizing the suction force is executed in combination with the above-described method of optimizing the suction timing. For this reason, the description that overlaps with the method of optimizing the suction timing will be omitted.

Figure 12:
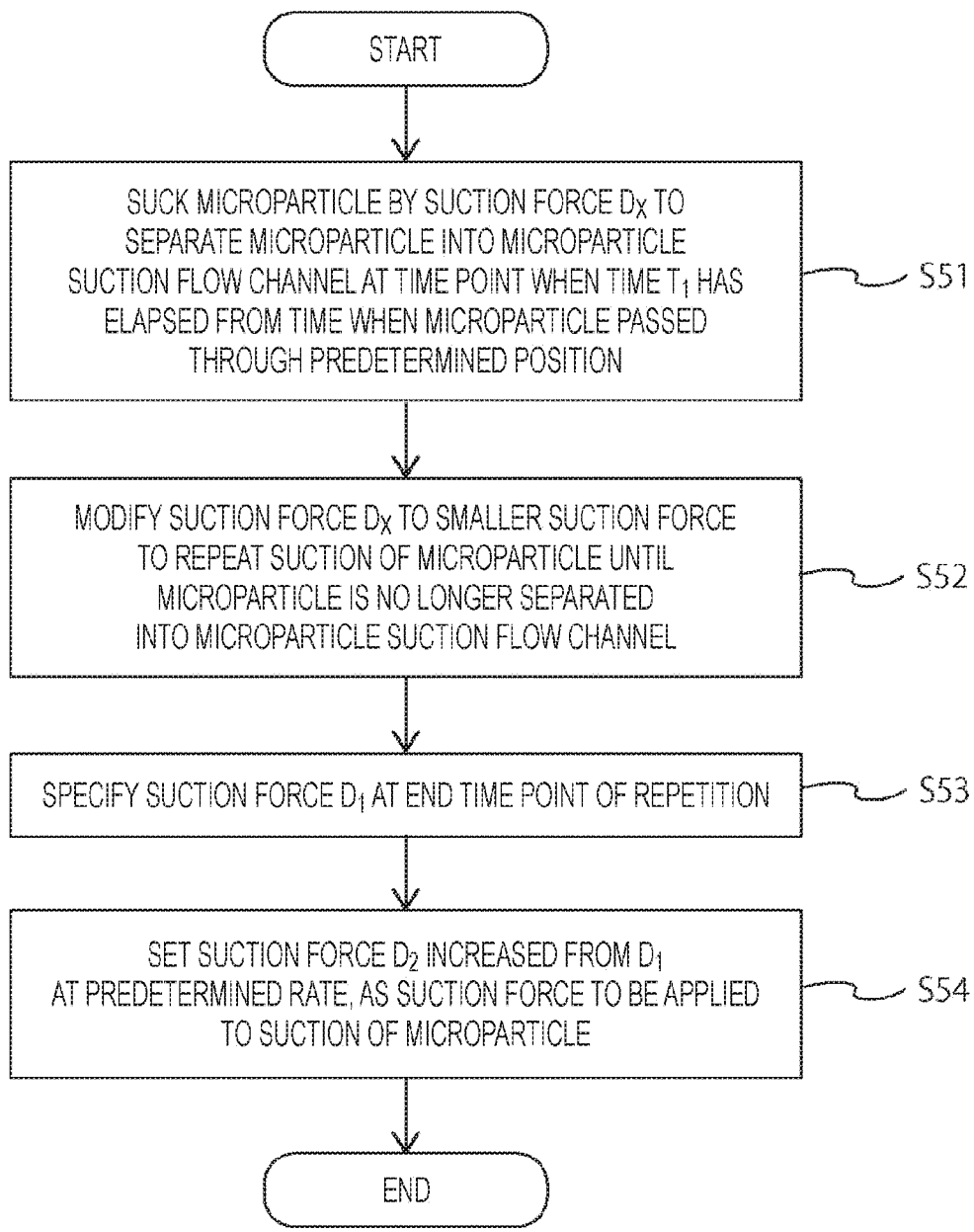
FIG. 12 is a flowchart illustrating an example of processing executed by the microparticle separation device.

FIG. 12 is a flowchart illustrating an example of processing executed by the microparticle separation device 10. First, the suction unit 19 executes a suction process of sucking a microparticle by a suction force $D_X$ to separate the microparticle into the microparticle suction flow channel at a time point when the time $T_1$ has elapsed from a time when the microparticle passed through the predetermined position (step S51). Next, the suction force specifying unit 20 executes a suction force specifying process of modifying the suction force $D_X$ to a smaller suction force to repeat the suction process until the microparticle is no longer separated into the microparticle suction flow channel (step S52), and specifying a suction force $D_1$ at an end time point of the repetition (step S53). The suction force assignment unit 21 executes a suction force assignment process of setting a suction force $D_2$ increased from the $D_1$ at a predetermined rate, as a suction force to be applied to the suction of the microparticle (step S54).

In the suction force assignment process, a suction force increased from $D_1$ at a predetermined rate is assumed as the $D_2$. The predetermined rate can be freely set such that the $D_2$ has a suction force that can separate the microparticle. For example, assuming that the suction process is repeated while the $D_X$ is modified to a smaller suction force and the suction process is performed N times until the microparticle is no longer separated into the microparticle suction flow channel, a suction force $D_N$ at the N-th suction process represents the suction force $D_1$ at the end time point of the repetition. The suction force $D_2$ in this case may be assumed as, for example, an N–M-th suction force $D_{N-M}$. It is preferable that the value of M be not too large in order to calculate a more preferred suction force $D_2$, and can be set to, for example, a value of about one to five.

With the above-mentioned process, the microparticles can be separated with an optimum suction force capable of reducing the amount of the sample fluid and/or sheath fluid sucked together with the microparticles, while being capable of sucking the microparticles flowing through the main flow channel.

Figure 13:
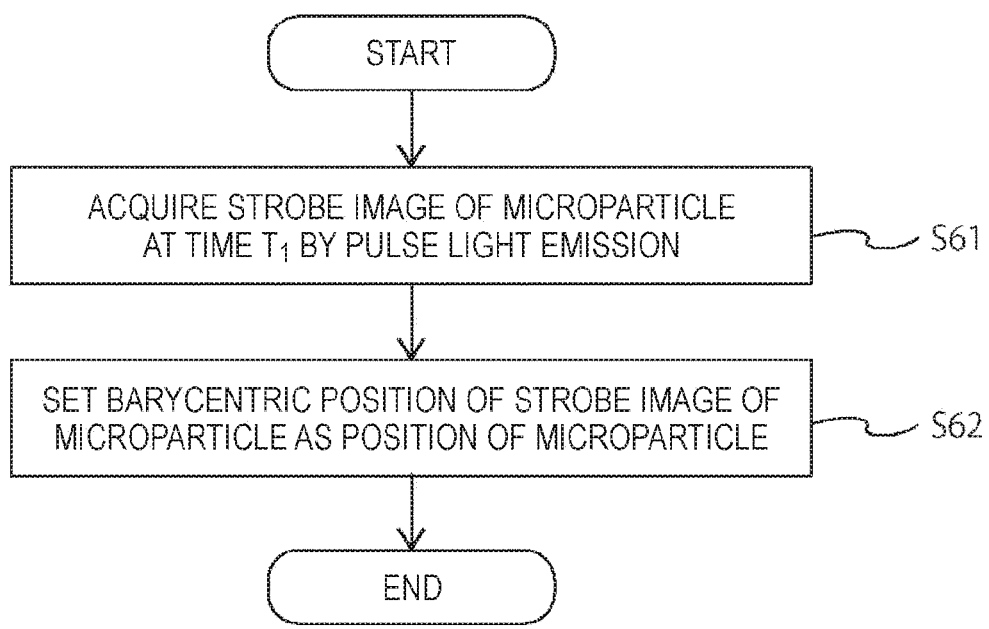
FIG. 13 is a flowchart illustrating an example of processing of specifying the position of a microparticle.

Next, an example of a method of determining whether or not the microparticles have been separated at a time point when the time $T_1$ has elapsed in the suction force specifying process will be described with reference to FIG. 13. FIG. 13 is a flowchart illustrating an example of processing of specifying the position of a microparticle.

The microparticle image acquisition unit 17 executes a microparticle image acquisition process of acquiring a strobe image of a microparticle at the time $T_1$ by pulse light emission (step S61). The position acquisition unit 18 executes a position acquisition process of setting a barycentric position of the strobe image of the microparticle as the position of the microparticle (step S62).

Figure 14:
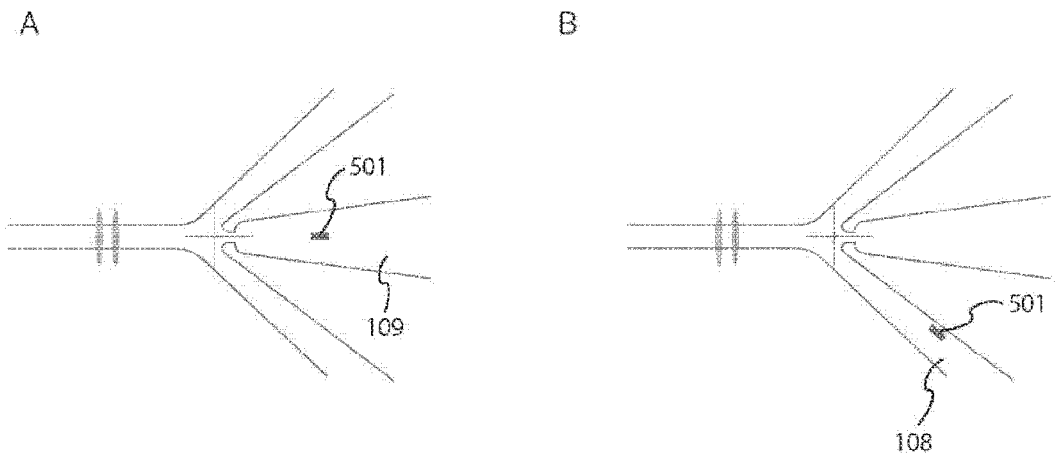
FIGS. 14A and B are diagrams illustrating an example of a strobe image of a microparticle.

FIGS. 14A and B are diagrams illustrating an example of a strobe image of a microparticle 501. FIG. 14A is a strobe image indicating a state in which the microparticle 501 is sucked in the microparticle suction flow channel 109. In the case of the example illustrated in FIG. 14A, the suction force specifying unit 20 determines that the microparticle has been separated. FIG. 14B is a strobe image indicating a state in which the microparticle 501 has run to the branch flow channel 108. In the case of the example illustrated in FIG. 14B, the suction force specifying unit 20 determines that the microparticle has not been separated.

The present technology can be also configured as described below.

[1] A method of optimizing a microparticle suction condition, using a microchip having a main flow channel through which a liquid containing a microparticle flows, a microparticle suction flow channel arranged coaxially with the main flow channel, and a branch flow channel branching from the main flow channel, the method including:

a branch point specifying process of specifying a branch point at which the branch flow channel branches from the main flow channel; and a time assignment process of assigning a time $T_1$ to be applied to suction of the microparticle, on the basis of a distance between a position of the microparticle and the branch point at a time point when a predetermined time $T_X$ has elapsed from a time when the microparticle passed through a predetermined position on the main flow channel.

[2] The method of optimizing the microparticle suction condition according to [1], further including a distance calculation process of calculating the distance, in which the time assignment process performs the distance calculation process a plurality of times while modifying the time $T_X$, and sets a time in a case where the distance is shortest as the $T_1$.

[3] The method of optimizing the microparticle suction condition according to [1] or [2], further including:

a suction process of sucking the microparticle by a suction force $D_X$ to separate the microparticle into the microparticle suction flow channel at a time point when the time $T_1$ has elapsed from a time when the microparticle passed through the predetermined position;

a suction force specifying process of modifying the suction force $D_X$ to a smaller suction force to repeat the suction process until the microparticle is no longer separated into the microparticle suction flow channel, and specifying a suction force $D_1$ at an end time point of the repetition; and a suction force assignment process of setting a suction force $D_2$ increased from the $D_1$ at a predetermined rate, as a suction force to be applied to suction of the microparticle.

[4] The method of optimizing the microparticle suction condition according to any one of [1] to [3], in which the branch point specifying process includes:

a trajectory image acquisition process of acquiring a fluorescence image indicating a trajectory of a microparticle flowing through the main flow channel and the branch flow channel by continuous light emission;

an image extraction process of dividing the fluorescence image into a plurality of blocks to binarize the divided blocks, and extracting a block including an image of the trajectory; and a branch point acquisition process of specifying an end block corresponding to an end portion of the main flow channel from among the blocks including images of the trajectory, and setting a barycentric position of an image of the end block as the branch point.

[5] The method of optimizing the microparticle suction condition according to any one of [2] to [4], further including:

a microparticle image acquisition process of acquiring a strobe image of the microparticle at the time $T_X$ by pulse light emission; and a position acquisition process of setting a barycentric position of the strobe image of the microparticle as a position of the microparticle, in which the distance calculation process uses the position of the microparticle obtained in the position acquisition process.

[6] The method of optimizing the microparticle suction condition according to any one of [3] to [5], further including:

a microparticle image acquisition process of acquiring a strobe image of the microparticle at the time $T_1$ by pulse light emission; and a position acquisition process of setting a barycentric position of the strobe image of the microparticle as a position of the microparticle, in which the suction force specifying process determines whether or not the microparticle has been separated, on the basis of the position of the microparticle obtained in the position acquisition process.

[7] The method of optimizing the microparticle suction condition according to any one of [1] to [6], further including:

an irradiation process of forming a plurality of beam spots at different positions on the main flow channel;

a speed calculation process of calculating speed of the microparticle on the basis of a distance between any beam spots and a time during which the microparticle passes through the distance; and a time calculation process of setting a time calculated on the basis of a distance from the predetermined position and the speed, as the time $T_X$.

[8] A microparticle separation device including:

a microchip having a main flow channel through which a liquid containing a microparticle flows, a microparticle suction flow channel arranged coaxially with the main flow channel, and a branch flow channel branching from the main flow channel;

a branch point specifying unit that specifies a branch point at which the branch flow channel branches from the main flow channel; and a time assignment unit that assigns a time $T_1$ to be applied to suction of the microparticle, on the basis of a distance between a position of the microparticle and the branch point at a time point when a predetermined time $T_X$ has elapsed from a time when the microparticle passed through a predetermined position on the main flow channel.

REFERENCE SIGNS LIST

10 Microparticle separation device
11 Branch point specifying unit
111 Trajectory image acquisition unit
112 Image extraction unit
113 Branch point acquisition unit
12 Distance computation unit
13 Time assignment unit
14 Illumination unit
15 Speed calculation unit
16 Time calculation unit
17 Microparticle image acquisition unit
18 Position acquisition unit
19 Suction unit
20 Suction force specifying unit
21 Suction force assignment unit
50 Optical system device
60 Control system device
100 Microchip
105 Main flow channel
108 Branch flow channel
109 Microparticle suction flow channel
301 Trajectory of microparticle
302 Branch point
303 End block
401, 402 Beam spot
501 Microparticle

The invention claimed is:

1. A method of optimizing a microparticle suction condition, using a microchip having a main flow channel through which a liquid containing a microparticle flows, a microparticle suction flow channel arranged coaxially with the main flow channel, and a branch flow channel branching from the main flow channel, the method comprising:

a branch point specifying process of specifying a branch point at which the branch flow channel branches from the main flow channel; and a time assignment process of assigning a time T1 to be applied to suction of the microparticle, on a basis of a distance between a position of the microparticle and the branch point at a first time point when a predetermined time TX has elapsed from a time when the microparticle passed through a predetermined position on the main flow channel.

2. The method of optimizing the microparticle suction condition according to claim 1, further comprising a distance calculation process of calculating the distance, wherein the time assignment process performs the distance calculation process a plurality of times while modifying the predetermined time TX, and sets the time T1 in a case where the distance is shortest.

3. The method of optimizing the microparticle suction condition according to claim 1, further comprising:

a suction process of sucking the microparticle by a suction force DX to separate the microparticle into the microparticle suction flow channel at a second time point when the time T1 has elapsed from the time when the microparticle passed through the predetermined position;

a suction force specifying process of modifying the suction force DX to a smaller suction force to repeat the suction process until the microparticle is no longer separated into the microparticle suction flow channel, and specifying a suction force D1 at an end time point of the repetition; and a suction force assignment process of setting a suction force D2 increased from the D1 at a predetermined rate, as a suction force to be applied to the suction of the microparticle.

4. The method of optimizing the microparticle suction condition according to claim 1, wherein the branch point specifying process includes:

a trajectory image acquisition process of acquiring a fluorescence image indicating a trajectory of the microparticle flowing through the main flow channel and the branch flow channel by continuous light emission;

an image extraction process of dividing the fluorescence image into a plurality of blocks to binarize the divided blocks, and extracting a block including an image of the trajectory; and a branch point acquisition process of specifying an end block corresponding to an end portion of the main flow channel from among the blocks including images of the trajectory, and setting a barycentric position of an image of the end block as the branch point.

5. The method of optimizing the microparticle suction condition according to claim 2, further comprising:

a microparticle image acquisition process of acquiring a strobe image of the microparticle at the predetermined time TX by pulse light emission; and a position acquisition process of setting a barycentric position of the strobe image of the microparticle as the position of the microparticle, wherein the distance calculation process uses the position of the microparticle obtained in the position acquisition process.

6. The method of optimizing the microparticle suction condition according to claim 3, further comprising:

a microparticle image acquisition process of acquiring a strobe image of the microparticle at the time T1 by pulse light emission; and a position acquisition process of setting a barycentric position of the strobe image of the microparticle as the position of the microparticle, wherein the suction force specifying process determines whether or not the microparticle has been separated, on a basis of the position of the microparticle obtained in the position acquisition process.

7. The method of optimizing the microparticle suction condition according to claim 1, further comprising:

an irradiation process of forming a plurality of beam spots at different positions on the main flow channel;

a speed calculation process of calculating speed of the microparticle on a basis of a distance between any beam spots and the time during which the microparticle passes through the distance; and a time calculation process of setting a time calculated on a basis of a distance from the predetermined position and the speed, as the predetermined time TX.

8. A microparticle separation device comprising:

a microchip having a main flow channel through which a liquid containing a microparticle flows, a microparticle suction flow channel arranged coaxially with the main flow channel, and a branch flow channel branching from the main flow channel;

a branch point specifying unit configured to specify a branch point at which the branch flow channel branches from the main flow channel; and a time assignment unit configured to assign a time $T_1$ to be applied to suction of the microparticle, on a basis of a distance between a position of the microparticle and the branch point at a time point when a predetermined time $T_x$ has elapsed from a time when the microparticle passed through a predetermined position on the main flow channel.

* * * * *